Jan. 7, 1969  C. E. JOHNSON, JR  3,421,012
DISPLACEMENT MEASURING ENCODER WITH UNIFORMLY DISTRIBUTED
FLUX MEANS AND COEXTENSIVE FLUX INTERRUPTING MEANS
Filed Sept. 8, 1966
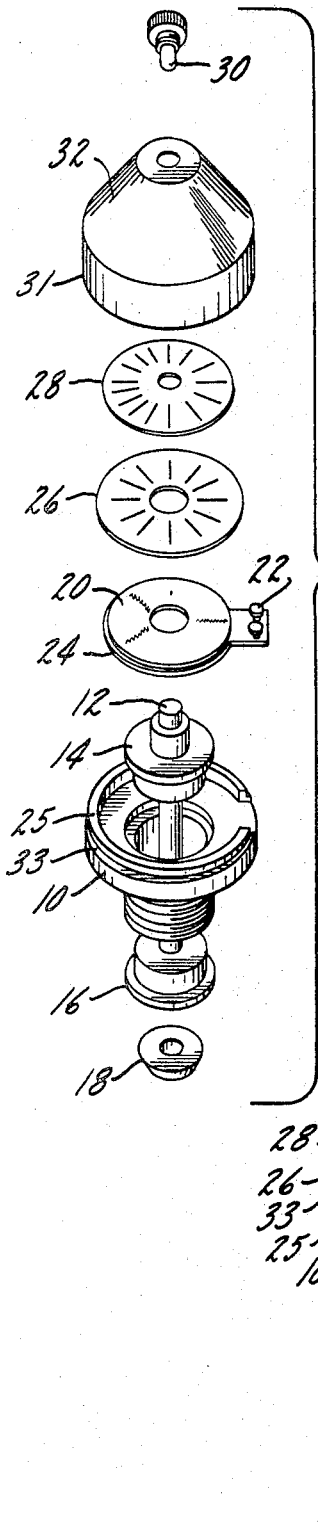
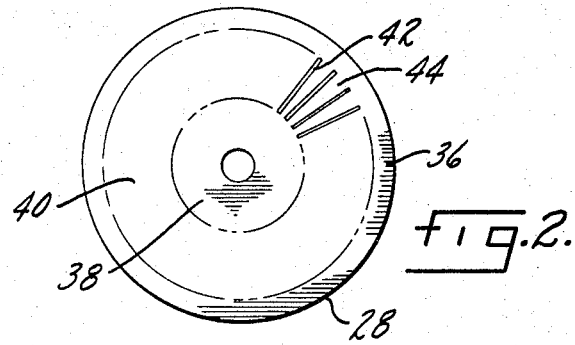
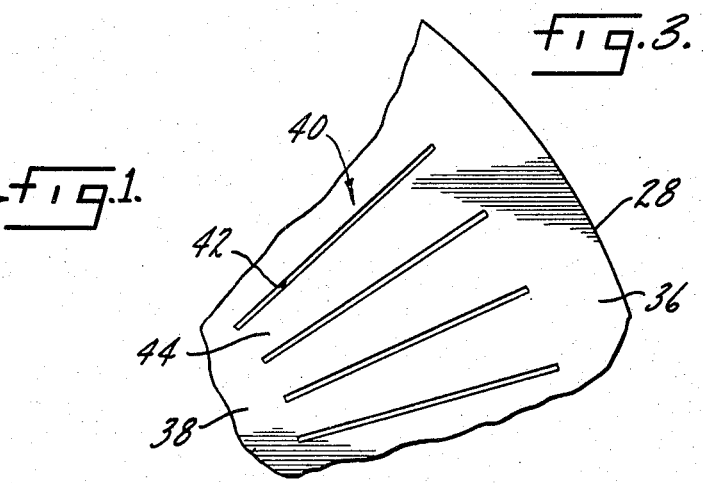
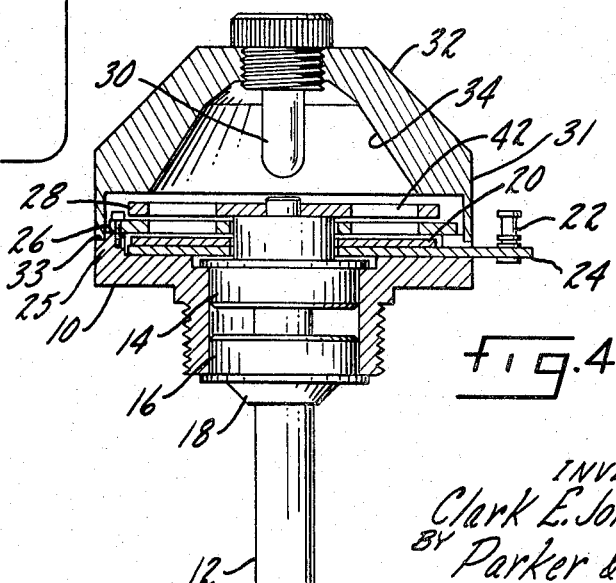
INVENTOR.
Clark E. Johnson, Jr.
BY Parker & Carter
Attorneys.

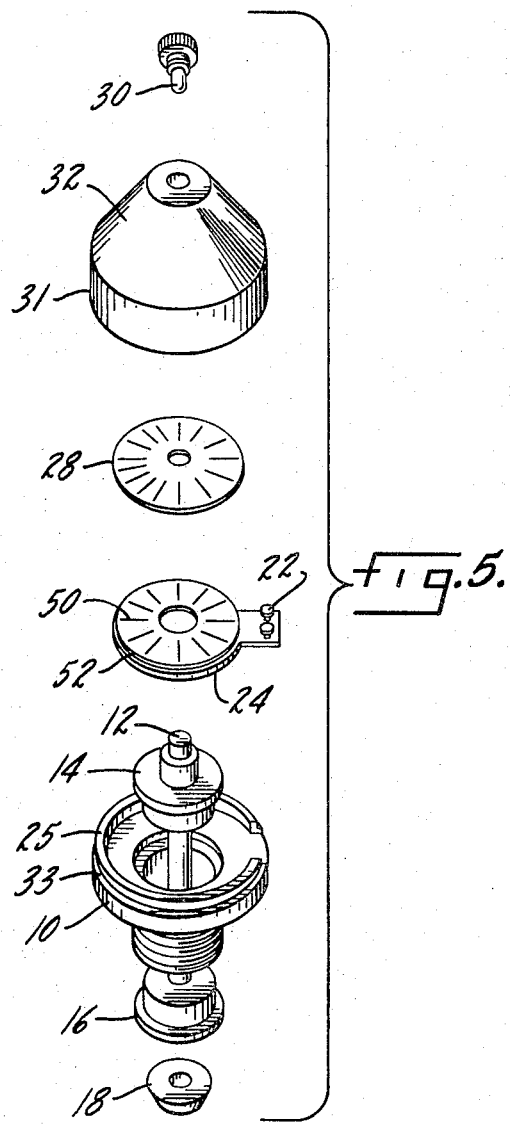

United States Patent Office 3,421,012
Patented Jan. 7, 1969

3,421,012
DISPLACEMENT MEASURING ENCODER WITH UNIFORMLY DISTRIBUTED FLUX MEANS AND COEXTENSIVE FLUX INTERRUPTING MEANS
Clark E. Johnson, Jr., 60 Pinecroft Road, Weston, Mass. 02193
Continuation-in-part of application Ser. No. 522,155, Jan. 21, 1966. This application Sept. 8, 1966, Ser. No. 578,433
U.S. Cl. 250—233    14 Claims
Int. Cl. G01d 5/34; G01j 3/00; G01n 21/00

ABSTRACT OF THE DISCLOSURE

A displacement encoder having a source of flux and a detector spaced from the source of flux. Positioned between the source of flux and the detector are a pair of flux interrupters. The source of flux provides generally uniform flux over the area of one of the interrupters with the two interrupters being generally co-extensive and having generally the same area as the detector. One of the flux interrupters is arranged for movement relative to the source and to the detector with each of the interrupters having alternate areas with differing flux transmissive qualities. The number of output pulses provided by the detector in a given amount of movement of one of the interrupters is related to the number of flux transmissive areas of one quality on one interrupter multiplied by the total number of flux transmissive areas of the same quality on the other interrupter, and divided by the greatest factor common to both numbers.

---

This invention relates to encoders, both a rotary encoder which provides a given number of output pulses per degree of revolution, and to a linear encoder which provides a given number of output pulses per unit displacement. This application is a continuation-in-part of my co-pending application Ser. No. 522,155, filed Jan. 21, 1966, now abandoned.

A primary purpose of the invention is an encoder of the type described utilizing a pair of flux interrupters positioned between a source of flux and a flux detector, with the number of pulses provided at the detector output being related to the number of interrupting areas on the discs.

Another purpose is a rotary encoder of the type described in which there may be a rotary disc and a stationary disc, with each of the discs having radially extending areas which will pass light flux, with the areas between the flux passing areas being opaque.

Another purpose is a rotary encoder of the type described in which the number of pulses per revolution of the encoder shaft is related to the number of light slits in one disc times the number of light slits in second disc, divided by the greatest common factor between the two numbers.

Another purpose is a reliably operable simply constructed rotary encoder of the type described.

Another purpose is a rotary encoder in which the number of output pulses per complete revolution of the input shaft is directly related to the number of flux interrupting areas on the two discs spaced between the flux source and the flux detector.

Another purpose is an encoder of the type described which may be used with electromagnetic radiation and magnetic flux.

Another purpose is an encoder of the type described having an annular detector and in which one of the flux interrupting areas may be formed on the detector.

Another purpose is an encoder of the type described in which both flux interrupting areas may rotate relative to each other.

Other purposes will appear in the ensuing specification, drawings and claims.

The invention will be described in connection with a following drawings wherein:

FIGURE 1 is an exploded perspective of a rotary encoder of the type described,

FIGURE 2 is a top plan view of one of the interrupting discs utilized in FIGURE 1, FIGURE 3 is an enlargement of a portion of the disc illustrated in FIGURE 2, FIGURE 4 is an axial section through the encoder of the type described, and FIGURE 5 is an exploded perspective, similar to FIGURE 1, showing a modified form of the invention.

Present-day shaft angle or displacement encoders are complex and expensive. None of the encoders now on the market are capable of easy mass production. The present invention discloses a design which is simple, has few parts and a minimum of precise components. This encoder is easily manufactured in volume at low cost. The present encoder in addition eliminates optics, i.e., lenses, and has no requirement for precision alignment of lamp filaments. By employing symmetrically arranged parts, tremendous averaging effects are achieved, thus reducing the tolerance requirements of critical parts and providing a uniform output.

The invention will be described in connection with a rotary encoder, but it should be understood that the principles disclosed herein are equally applicable to linear encoders.

Turning first to FIGURE 1, the rotary encoder may include a bearing housing 10, generally annular in form, and having sections of varying diameter. A shaft 12 may be mounted in the housing 10 by means of bearings 14 and 16, which are positioned at opposite ends of the shaft. A bearing retainer 18 may hold bottom bearing 16 in position. Mounted concentrically with the shaft 12 is a detector 20 which may take a variety of forms, but as shown herein is a photocell, as the invention is described in connection with light as the flux medium. The photocell 20 may have output terminals 22 and may be mounted on a board 24. An annular shoulder 25 on the bearing housing 10 may enclose and hold the board 24 in position. The photocell 20 is annular in form, and may be a single annular element or it may be a series of individual photocells, closely spaced together, and positioned in an annular array. It is important that the detector be completely circumferential or substantially so.

Positioned directly adjacent the photocell 20 is an interrupter or disc 26 which is fixed on the annular shoulder 25 and hence to the housing 10. Adjacent disc 26 is a second disc 28 which is fixed to the shaft 12. There will be rotary movement between discs or interrupters 28 and 26, when the shaft 12 is turned externally. The structure may be completed by a lamp or light source 30 which is positioned within a lamp housing and reflector 32. An external annular surface 31 of the lamp housing 32 may seat upon an external shoulder 33 of the bearing housing 10.

The internal reflective surface 34 of the lamp housing 32 is so formed that the rays of light which are reflected from this surface will be directed in a generally parallel pattern toward the discs 28 and 26. In this way the maximum amount of light will be directed toward the detector.

Turning to FIGURE 2, the disc 28 may include an outer circumferential opaque area 36, and an inner annular opaque area 38. Between the areas 36 and 38 is an annular area 40 which is made up of a plurality of individual slits or clear areas 42 separated by opaque areas 44. The number and width of slits will vary depending upon the number of desired output pulses. In like manner, the precise makeup of the discs or interrupters will vary, as what is important is to provide alternate areas which have differing flux transmissive qualities. FIGURE 3 is an enlargement of the disc illustrated in FIGURE 2, and it can be seen that the width of each of the slits 42 is substantially less than the opaque areas 44 between the slits. Naturally, the slits 42 and the width of the areas 44 would decrease as the number of slits increases.

Disc 26 is substantially the same as disc 28 with the exception that it has a greater central opening as it is attached to the housing and must be free of the shaft 12. The slits formed on the disc 28 may be radially the same length as the slits 42 on the disc 28, and they may be the same width, however, the spacing between slits on the two discs will generally not be the same. If a series of closely spaced individual photocells are used as the annular detector, there may be one such photocell positioned in alignment with each slit in disc 26. The invention will work satisfactorily if the number of slits is the same on both discs, however, the preferred arrangement utilizes a different number of slits on each disc. The slits are equally spaced around each of the discs.

As shown herein, disc 26 is fixed and disc 28 rotates or moves. It should be understood that both discs may rotate providing there is relative or different movement between them.

The number of pulses of light which will be received by the detector 20 will be dependent upon the number of shutterings or interruptions provided by relative movement between the discs. The number of pulses in a complete revolution of disc 28 is determined by the formula $NXM/GCF$, where N is equal to the total number of slits in disc 26 and M is equal to the total number of slits in disc 28. GCF is the greatest common factor which can be divided into N and M. As an example, assume there are 40 slits in disc 26 and 75 slits in disc 28. The greatest common factor between 40 and 75 is five, and thus the number of pulses for a complete revolution of the disc 28 will be 600. The greatest common factor can, of course, vary. It is preferred that this number be greater than one to provide averaging. However, a GCF of one will be satisfactory in some applications.

The greater the number of slits in each disc, the more light that is provided at the detector, and the more accurate the encoder becomes. By having a greater amount of light arrive at the detector or photocell, the amplitude of the output pulses is greater, hence the signal-to-noise ratio is increased, and false readings from this source are substantially eliminated. The greatest common factor equals the number of coincidences which occur simultaneously. These simultaneous coincidences always occur at equally spaced intervals around the photocell or detector. This averaging cancels out errors which otherwise would result from misalignment and eccentricity of the components. By errors I am referring to pulses which occur at an angular position different from their ideal position.

To further illustrate the principle behind the present invention, consider the situation in which disc 26 has 12 slits, located at 30 degrees angular intervals, and disc 28 has 15 slits, located at 24 degree angular intervals. Going back to the formula, in this case $N \times M = 12 \times 15 = 180$, and $GCF = 3$, therefore there are 180 coincidences per complete revolution of disc 28, occurring three at a time (equiangularly) producing 60 output pulses per revolution, one each 6 degrees of rotation.

Although the invention has been described in connection with light as the flux source, it should be realized that any electromagnetic radiation or other forms of radiation are equally satisfactory. It is only necessary to change the detector and the source. In some applications it may be also necessary to change the material in the flux interrupter as some electromagnetic radiations would necessitate differing materials in formation of the discs. In like manner, it is possible to use magnetic flux.

In its simplest form, the discs 26 and 28 may be formed of an opaque plastic with the slits cut out. In other forms of the invention, the slits may be formed of a clear material and the remaining portions of the discs may be formed of an opaque material. The housing, and other parts of the encoder, may be formed of plastic, metal or any other suitable material. The internal surface of the lamp housing or reflector must necessarily be of material which reflects the type of flux being used.

FIGURE 5 is substantially the same as FIGURE 1, except that disc 26 and the detector have been combined into one element. Equally spaced slits 50 have been formed on the annular surface of photocell 52. For example, the photocell may be sprayed with an opaque substance such as paint or may be formed in some other satisfactory manner to provide areas of differing flux transmissive qualities. All other components of FIGURE 5 are identical with FIGURE 1 and have like numbers. There will be relative movement between disc 28 and the flux transmissive areas on the photocell if only disc 28 moves or if both disc 28 and the detector 52 move, but at different rates.

In one form of the invention one or both of the interrupter discs may be separated into two sections, with these sections being concentric with each other and having approximately the same cross sectional area. Assuming it is only one disc which is so separated, and that the photocell or detector is similarly divided into two generally equal areas, if the inner of the two separated discs is shifted angularly by an increment of $$\frac{1}{4} \times \frac{GCF}{N \times M}$$

then each half size detector will produce $$\frac{N \times M}{GCF}$$

output pulses per revolution of disc 28. The pulses produced by the two detectors, which may be termed two channels, will occur alternately and at equally spaced angular intervals. Such an arrangement may double the number of pulses per revolution of disc 28 and also may provide a means for sensing direction of rotation.

An additional modification would be to divide one or more of the discs into more than two generally equal areas while dividing the photocell into similar areas. With three or more photocell areas, the encoder may provide zero referencing and absolute readout.

In some applications it may be desirable to use a compensator photocell which is connected back-to-back with the readout cell and is used to compensate for ambient light. The output of the compensator cell is adjusted so that the output of the encoder swings approximately equally and negative rather than merely in one direction. Such an arrangement cancels out the effects of line voltage and bulb aging fluctuations.

As mentioned above, the principles disclosed herein are equally applicable to a linear encoder. In such an arrangement the flux interrupters have generally parallel slits with the slits being generally perpendicular to the direction of movement of one of the interrupters. The same mathematical formula developed above is applicable to the linear encoder.

Whereas the preferred form of the invention has been shown and described herein, it should be realized that there are many modifications, substitutions and alterations thereto within the scope of the following claims.

I claim:
1. In an encoder, a source of flux, a detector spaced from said flux source and arranged to provide pulses of electrical energy in accordance with interruptions of said flux, a pair of generally co-extensive flux interrupters positioned between said source and said detector, said de- tector having the same general area as said interrupters, said source of flux providing substantially uniform flux over the area of one of said interrupters, one of said interrupters being stationary relative to said source and detector, with the other interrupter being arranged for movement relative to said source and detector, each of said interrupters having alternate areas with differing flux transmissive qualities, with the number of pulses provided by said detector in a given amount of movement of said movable interrupter being determined by the total number of flux transmissive areas of one quality of the movable interrupter multiplied by the total number of flux transmissive areas of the same quality on the stationary interrupter and divided by the greatest factor common to both numbers.

2. The structure of claim 1 further characterized in that said movable interrupter is rotatable with said areas of differing flux transmissive qualities extending in a radial direction.

3. The structure of claim 2 further characterized in that the number of such areas in the movable interrupter is different from the number of such areas in the stationary interrupter.

4. The structure of claim 3 further characterized in that said flux is in the form of electromagnetic radiation.

5. The structure of claim 4 further characterized in that each of said interrupters is in the form of a disc with alternate equally spaced radially extending areas of differing light transmitting ability.

6. The structure of claim 5 further characterized by and including a housing enclosing said flux source, detector and discs.

7. The structure of claim 6 further characterized by and including a shaft extending outwardly from said housing with said rotary disc being fast on said shaft and rotatable therewith.

8. The structure of claim 4 further characterized in that said rotary and stationary interrupters are in the form of discs with radially extending equally spaced areas which are alternately opaque, and clear for the transmission of light.

9. The structure of claim 8 further characterized by and including a reflector positioned adjacent said source of flux, and arranged to direct the radiation from said source, generally in a parallel direction toward said detector.

10. The structure of claim 1 further characterized in that the number of areas of differing flux transmissive qualities on the stationary interrupter is different from the number of such areas on the movable interrupter.

11. In an encoder, a source of flux, a detector spaced from said flux source and arranged to provide pulses of electrical energy in accordance with interruptions of said flux, a pair of generally co-extensive flux interrupters positioned between said source and said detector, said detector having the same general area as said interrupters, said source of flux providing substantially uniform flux over the area of one of said interrupters, at least one of said interrupters being arranged for movement relative to said source and detector, each of said interrupters having alternate areas with differing flux transmissive qualities, with the number of pulses provided by said detector in a given amount of movement of said movable interrupter being determined by the total number of flux transmissive areas of one quality on the movable interrupter multiplied by the total number of flux transmissive areas of the same quality on the other interrupter and divided by the greatest factor common to both numbers.

12. In an encoder, a source of flux, detector means spaced from said source and arranged to provide pulses of electrical energy in accordance with interruptions in said flux, a pair of generally co-extensive means for interrupting the flux activating said detector means, said detector means having the same general configuration and area as said interrupting means, said source of flux providing substantially uniform flux over the area of one of said interrupters, at least one of said interrupter means being an interrupter member arranged for movement relative to said detector, each of said interrupter means having alternate areas with differing flux transmissive qualities, with the number of pulses provided by said detector in a given amount of movement of said movable interrupter being determined by the total number of flux transmissive areas of one quality on the movable interrupter multiplied by the total number of flux transmissive areas of the same quality on the other interrupter means and divided by the greatest factor common to both numbers.

13. The structure of claim 12 further characterized in that the other of said interrupter means includes areas with differing flux transmissive qualities formed on said detector.

14. The structure of claim 12 further characterized in that said detector means is annular and substantially circumferentially continuous.

References Cited

UNITED STATES PATENTS

| | | | |
|---|---|---|---|
| 2,557,219 | 6/1951 | Flint et al. | 88—14 |
| 2,941,088 | 6/1960 | Mahaney | 250—233 |
| 3,058,001 | 10/1962 | Dertouzos | 250—233 X |
| 3,309,525 | 3/1967 | Johnson | 250—231 |

FOREIGN PATENTS 986,268    3/1951    France.

JAMES W. LAWRENCE, *Primary Examiner.*

V. LAFRANCHI, *Assistant Examiner.*

U.S. Cl. X.R.

88—14